US012183992B2

(12) United States Patent
Ying et al.

(10) Patent No.: US 12,183,992 B2
(45) Date of Patent: Dec. 31, 2024

(54) COMPOUND ANTENNA DEVICE FOR OMNIDIRECTIONAL COVERAGE

(71) Applicant: Sony Group Corporation, Tokyo (JP)

(72) Inventors: Zhinong Ying, Lund (SE); Kun Zhao, Malmö (SE)

(73) Assignee: Sony Group Corporation, Tokyo (JP)

( * ) Notice: Subject to any disclaimer, the term of this patent is extended or adjusted under 35 U.S.C. 154(b) by 145 days.

(21) Appl. No.: 17/788,381

(22) PCT Filed: Nov. 27, 2020

(86) PCT No.: PCT/EP2020/083587
§ 371 (c)(1),
(2) Date: Jun. 23, 2022

(87) PCT Pub. No.: WO2021/139922
PCT Pub. Date: Jul. 15, 2021

(65) Prior Publication Data

US 2023/0043856 A1 Feb. 9, 2023

(30) Foreign Application Priority Data

Jan. 8, 2020 (SE) .................................... 2050009-6

(51) Int. Cl.
*H01Q 5/42* (2015.01)
*H01Q 1/24* (2006.01)
(Continued)

(52) U.S. Cl.
CPC ............... *H01Q 5/42* (2015.01); *H01Q 1/241* (2013.01); *H01Q 1/28* (2013.01); *H01Q 1/42* (2013.01); *H01Q 21/205* (2013.01); *H01Q 21/28* (2013.01)

(58) Field of Classification Search
CPC H01Q 5/42; H01Q 1/241; H01Q 1/28; H01Q 1/42; H01Q 21/205; H01Q 21/28
See application file for complete search history.

(56) References Cited

U.S. PATENT DOCUMENTS 4,605,932 A 8/1986 Butscher
5,940,048 A 8/1999 Martek
(Continued)

FOREIGN PATENT DOCUMENTS

JP H10051233 A 2/1998

OTHER PUBLICATIONS

International Search Report and Written Opinion from corresponding International Application No. PCT/EP2020/083587, mailed on Feb. 15, 2021, 11 pages.
(Continued)

*Primary Examiner* — Graham P Smith
(74) *Attorney, Agent, or Firm* — Tucker Ellis LLP

(57) ABSTRACT

A composite antenna device (10) configured for omnidirectional operation, comprising a first antenna system (100) configured for use in a first frequency band of a first frequency range (FR2), comprising multiple first antenna elements (110, 110A) arranged in a cylindrical configuration; a second antenna system (200) configured for use in a second frequency band of a second frequency range (FR1) at a frequency which is lower than the first frequency band; and a housing (11) enclosing the first and second antenna systems, wherein the first and the second antenna systems are configured for omnidirectional operation about an axis (12) of the composite antenna device.

17 Claims, 6 Drawing Sheets

(51) Int. Cl.

| | |
|---|---|
| ***H01Q 1/28*** | (2006.01) |
| ***H01Q 1/42*** | (2006.01) |
| ***H01Q 21/20*** | (2006.01) |
| ***H01Q 21/28*** | (2006.01) |

(56) References Cited

U.S. PATENT DOCUMENTS

| | | | | |
|---|---|---|---|---|
| 6,369,774 | B1 | 4/2002 | Lucidarme | |
| 2001/0035905 | A1 | 11/2001 | Auffret | |
| 2002/0113743 | A1 | 8/2002 | Judd | |
| 2002/0186171 | A1 | 12/2002 | Petros | |
| 2014/0022131 | A1 | 1/2014 | Azulay | |
| 2017/0317397 | A1 | 11/2017 | Faraone | |
| 2018/0034166 | A1 | 2/2018 | Hinman | |
| 2018/0076864 | A1 | 3/2018 | Jan | |
| 2018/0366816 | A1 | 12/2018 | Jan | |
| 2018/0367199 | A1 | 12/2018 | Zimmerman | |
| 2019/0020714 | A1 | 1/2019 | Lee | |
| 2019/0089419 | A1* | 3/2019 | Kim ...................... | H01Q 21/28 |
| 2019/0312337 | A1 | 10/2019 | Farzaneh | |

OTHER PUBLICATIONS

Office Action and Swedish Search Report from corresponding Swedish Application No. 2050009-6, mailed on Sep. 2, 2020; 8 pages.

* cited by examiner

COMPOUND ANTENNA DEVICE FOR OMNIDIRECTIONAL COVERAGE

TECHNICAL FIELD

This disclosure relates to the field of antenna systems for wireless terminals configured for wireless communication, and in particular to an antenna arrangement for use in at least two frequency ranges. Specifically, this disclosure presents various solutions for compound antenna devices configured for omnidirectional coverage.

BACKGROUND

Electronic devices often include wireless communications circuitry, and such electronic devices may be referred to as wireless terminals. For example, cellular telephones, computers, and other devices often contain antennas and wireless transceivers for supporting wireless communications.

In 3GPP documentation, a wireless terminal, or wireless communication device, is commonly referred to as a User Equipment (UE). A base station defines a cell and is operative to serve a surrounding area with radio access for UEs, by providing radio access to UEs within a cell. A base station may also be referred to as an access node, and various terms are used in 3GPP for different types of systems or specification. An access network, or Radio Access Network (RAN), typically includes a plurality of access nodes, and is connected to a Core Network (CN) which inter alia provides access to other communication networks. In the so-called 3G specifications, the term NodeB is used to denote an access node, whereas in the so-called 4G specifications, also referred to as Long-Term Evolution (LTE), the term eNodeB (eNB) is used. A further developed set of specifications for radio communication are referred to as the 5G type radio communication system (5GS), including the New Radio (NR) technology, wherein the term gNB is used to denote an access node. In NR, communication may be configured in frequency bands well into the mm wave spectrum, such as over 30 GHz. In this spectrum, wireless terminals and base stations may configured for beamforming, whereby transmission and reception may be spatially focused to a beam which covers a certain direction and width or cone angle.

In various configurations, a wireless terminal may be configured to operate in several frequency bands. This way, the wireless terminal may support communication in two or more frequency ranges which require different antenna systems.

Some types of wireless terminals include built-in antenna systems, for the purpose of convenience of use, such that no protruding antenna members are needed. For various types of wireless terminals, such as handheld phones, care must also be taken to regulatory radiation exposure, which may affect how and at what levels the wireless terminal is configured to transmit. Many types of wireless terminals are most frequently used for reception of data from the wireless network, such as for streaming or downloading of data. However, for certain applications, uplink transmission of data is a key feature. This may e.g. be related to live upload of streaming video data, as captured by a video camera device. For such purposes, high power transmission with full or near full sphere coverage is desirable, e.g. as outlined for Power class 4 in 3GPP specifications.

SUMMARY

The present disclosure serves to provide solutions for an antenna configuration suitable for use in an electronic device where uplink performance and wide angle coverage is desired. According to one aspect, such a solution is provided in accordance with independent claim 1, by means of an antenna device configured for omnidirectional operation, comprising:

- a first antenna system configured for use in a first frequency band of a first frequency range, comprising multiple first antenna elements arranged in a cylindrical configuration;
- a second antenna system configured for use in a second frequency band of a second frequency range at a frequency which is lower than the first frequency band; and
- a housing enclosing the first and second antenna systems, wherein the first and the second antenna systems are configured for omnidirectional operation about an axis of the composite antenna device.

The proposed solution provides a configuration of a compound antenna device suitable for use as an external antenna to an electronic device, and which is specifically suited for an implementation wherein the first antenna system is configured for beamforming.

Various embodiments are set out in the dependent claims.

BRIEF DESCRIPTION OF THE DRAWINGS

Various embodiments will be described with reference to the drawings, in which.

DETAILED DESCRIPTION

Figure 1A:
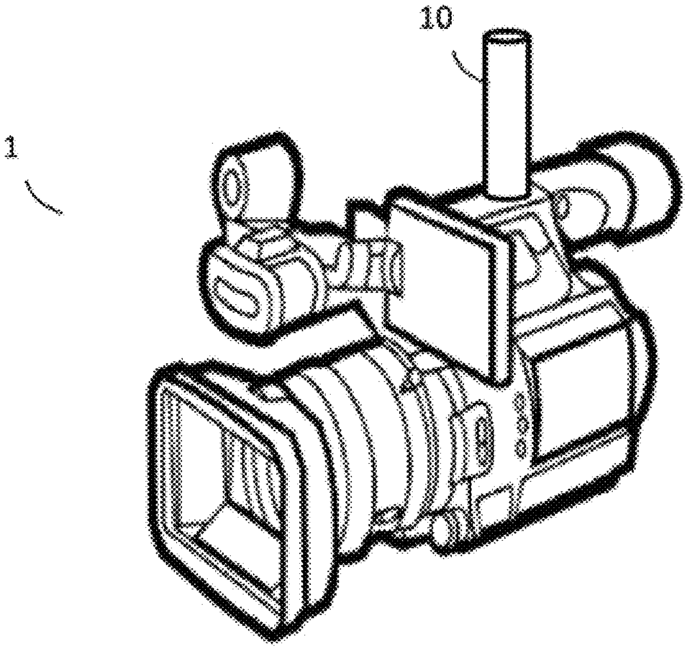
FIGS. 1A and 1B schematically illustrate different types of electronic devices configured for wireless communication by means of an antenna device according to various embodiments.

The invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected" to another element, it can be directly connected to the other element or intervening elements may be present. In contrast, when an element is referred to as being "directly connected" to another element, there are no intervening elements present. Like numbers refer to like elements throughout. It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

Various solutions are presented herein related to improvements in the art of antenna devices supporting at least two frequency bands in different frequency ranges (FR). Common for such embodiments is that a first frequency range has an associated upper frequency limit, whereas a second, higher, frequency range has an associated a lower frequency limit which is higher than the upper limit of the first frequency range. Embodiments are primarily presented for an antenna device for 3GPP frequency ranges FR1 and FR2 using a communication protocol in accordance with 5G. For instance, FR1 may have an associated upper frequency of 7.125 GHz, and FR2 (mm wave) may have an associated lower frequency limit of 24 GHz. However, alternative frequency ranges are plausible within the concept of the described embodiments. Moreover, the antenna device may be configured for operation in additional frequency bands of even lower ranges, and the antenna device may be configured to operate both under 4G and 5 g communication protocols.

FIG. 1A schematically illustrates an electronic device 1 in the form of a video camera device 1, configured to be used for upload of image data. Specifically, the video camera device 1 may be configured to be used for live, i.e. real time or near real time, transmission of video data. For this purpose, the video camera device is configured for communication in a wireless communication system, such as a cellular 3GPP system. The video camera device is therefore configured with an antenna device 10.

Figure 1B:
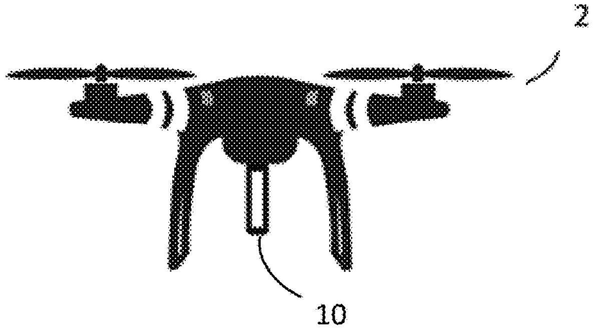

FIG. 1B schematically illustrates another example of an electronic device 2, in the form of a drone. The drone 2 may be configured for transmission of data in real time or near real time, such as captured video data obtained from a built-in video camera, and/or other obtained sensor data.

Figure 1C:
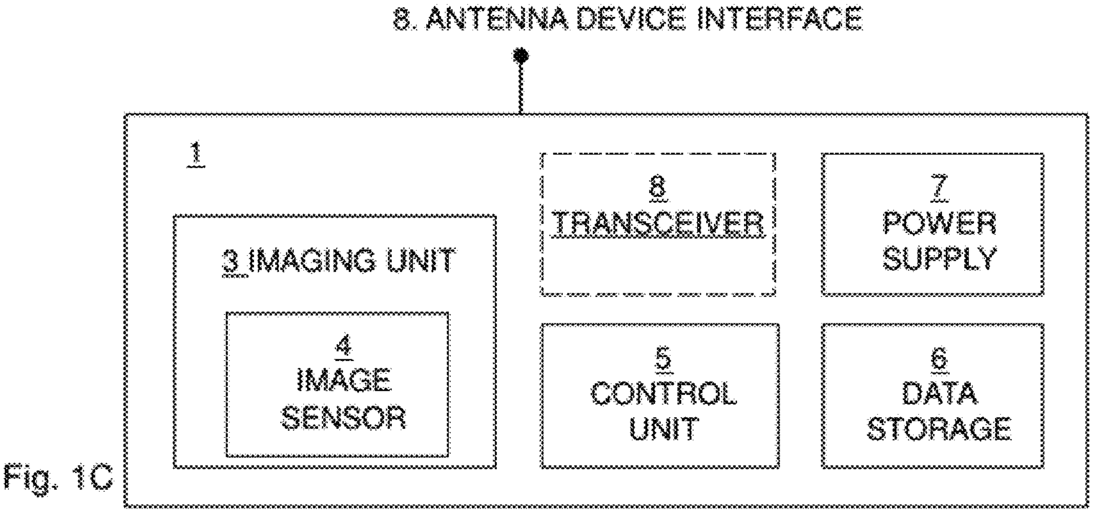
FIG. 1C schematically illustrates functional elements in an electronic device configured for wireless communication by means of an antenna device according to various embodiments.
Figure 2:
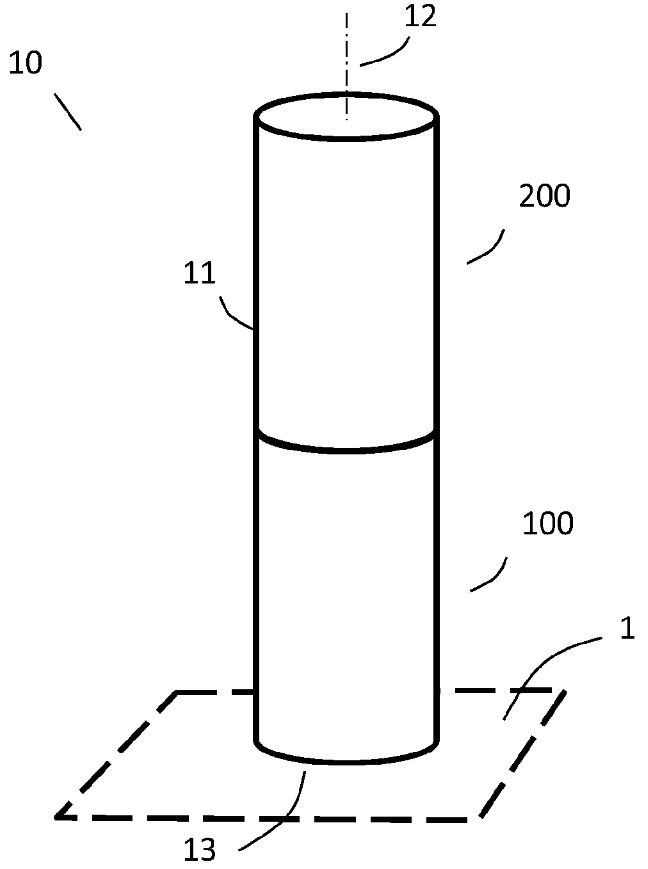
FIG. 2 schematically illustrates a perspective view of an antenna device according to a first overall configuration.

FIG. 1C schematically illustrates an electronic device 1 (or 2) in accordance with FIG. 1 or 2, featuring video camera capabilities. The electronic device thus comprises an imaging unit 3 including an image sensor, and possibly further elements such as a control unit at least one lens. The function of a video camera is not fundamental to the present disclosure and will therefore not be described in further detail. The electronic device may further comprise data storage device 6 or temporary or long term storage of inter alia image data obtained by the imaging unit 3. A control unit 5 configured to control operation of the electronic device, including video image capturing, storage and transmission. A power supply 7 is included to provide electric energy to the various elements of the electronic device 1. The electronic device 1 is further configured with an interface 8 to an antenna device 10, for wireless communication with a wireless network, e.g. for transmission of image data.

The electronic device 1 is configured to operate as a wireless terminal, and comprises a transceiver 8, such as a radio receiver and transmitter, for communicating with an access network through at least an air interface by use of the antenna device 10. The control unit 5 comprises logic, for example a controller or microprocessor. The logic may also comprise or be connected to the data storage device 6 configured to include a computer readable storage medium. The data storage device 6 may include a memory and may be, for example, one or more of a buffer, a flash memory, a hard drive, a removable media, a volatile memory, a non-volatile memory, a random access memory (RAM), or other suitable device. In a typical arrangement, the data storage device 6 includes a non-volatile memory for long term data storage and a volatile memory that functions as system memory for the controller 202. The data storage device 6 may exchange data with a processor 202 of the logic 201 over a data bus. The data storage device 6 is considered a non-transitory computer readable medium. One or more processors of the control unit 5 may execute instructions stored in the data storage device or a separate memory in order to carry out wireless terminal operation of the electronic device 1. In various embodiments, all or part of the units and functions of the wireless terminal may be configured in the antenna device 10, connected though the interface 8.

Various embodiments and associated features of the antenna device 10 will now be described. The described embodiments are suitable for, but not exclusively configured to, use with an electronic device 1 in the form of a video camera device. In various scenarios, the video camera device may benefit from both 4G and 5G RF (radio frequency) access. For powerful uplink high data communication, a high performance antenna system is required. This may include support for e.g. Power Class 4 omni coverage with high EIRP performance, as outlined in the table below from 3GPP technical specification xxx.

In some embodiments, the section comprising the first antenna system 100 is disposed closer to the interface 13 than the section housing the first antenna system 200. This has the benefit of causing lower RF loss caused by the first antenna system 100, which operates at a higher frequency range such as in the mm wave region, on the second antenna system 200.

| Power Class | Band | Min peak EIRP, dBm | Max EIRP dBm | Max TRP dBm | Min EIRP at CDF % TH -ile | Device type and beam shape, probable % of sphere covered |
|---|---|---|---|---|---|---|
| 1 | n257, n258, n261 | 40 | 55 | 35 | 32 @ 85% | Fixed Wireless Access |
| | n260 | 38 | | | 30 @ 85% | Single beam, ~15% |
| 2 | n257, n258, n261 | 29 | 43 | 23 | 18 @ 60% | Vehicle mounted UE |
| | n260 | N/A | N/A | N/A | N/A | Multi beams, ~40% |
| 3 | n257, n258, n261 | 22.4 | 43 | 23 | 11.5 @ 50% | Handheld UE |
| | n260 | 20.6 | | | 8 @ 50% | Multi beams, ~50% |
| 4 | n257, n258, n261 | 34 | 43 | 23 | 25 @ 20% | High power undefined mobile UE |
| | n260 | 31 | | | 19 @ 20% | targeting full sphere coverage |

The antenna devices as outlined herein are configured to obtain these requirements by means of a composite antenna device 10 configured for omnidirectional operation, for use as an external antenna to an electronic device 1.

FIG. 2 schematically illustrates a first configuration of the compound antenna device 10. This general embodiment shows a first section comprising a first antenna system 100 and a second section comprising a second antenna system 200. The first antenna system 100 is configured for use in a first frequency band and comprises multiple first antenna elements arranged in a cylindrical configuration. The second antenna system 200 is configured for use in a second frequency band at a frequency which is lower than the first frequency band. The compound antenna device 10 further comprises a housing 11, which as such may be formed of more than one housing part, which housing encloses the first and second antenna systems. The first and the second antenna systems are configured for omnidirectional operation about an axis 12 of the composite antenna device. The drawing further illustrates an interface 13 for connection to the electronic device 1. The interface may provide for electronic connection to e.g. the power supply 7 of the electronic device, and to further circuitry of the electronic device. The interface 13 may further provide for a mechanical connection to the electronic device.

In some embodiments, the first frequency band in which the first antenna system 100 is configured to operate includes FR2, comprising the mm wave spectrum, e.g. over 20 GHz. The second frequency band in which the second antenna system s00 is configured to operate may include FR1, e.g. below 6 GHz.

In some embodiments, the sections comprising the first antenna system 100 and the second antenna system 200, respectively, are separate connectable elements along the axis 12. As shown in FIG. 2, the housing 11 may have a tubular structure, wherein the sections occupy separate parts in the longitudinal direction of the housing 11, along the axis 12. By means of this arrangement, the combined compound antenna 10 may be configured by selection and combinations of sections comprising antenna systems 100, 200 (or more) that are usable in a certain region or country. This provides a benefit in terms of production and assembly and may in various embodiments also allow switching of one or more of the antenna systems 100, 200 by combining alternative sections comprising antenna systems, even by and end user or operator.

Figure 3:
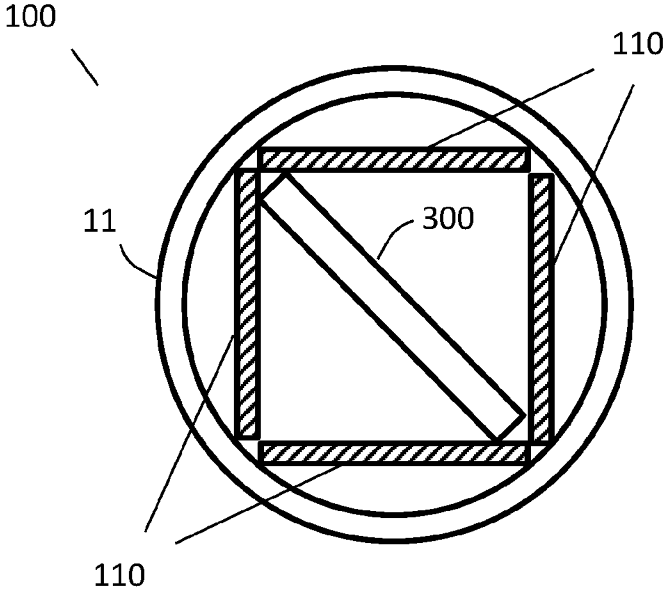
FIG. 3 schematically illustrates a cross-section view of a first antenna system part of the antenna device configuration of FIG. 2, according to an embodiment.

FIG. 3 schematically illustrates an embodiment of the first antenna system 100, in a cross-sectional view through the first section of the housing 11. In the shown embodiment, each first antenna element comprises an array panel 110. The array panels may be arranged in the housing so as to face in different directions with respect to each other. In one embodiment, as shown in FIG. 3, each array panel 110 face away from the axis 12. This way, a center region or compartment about the axis 12 is formed by means of the array panels 110. The array panels 110 may be arranged with side edges adjacent one and another, or even in contact with each other, around the center region.

Figure 4A:
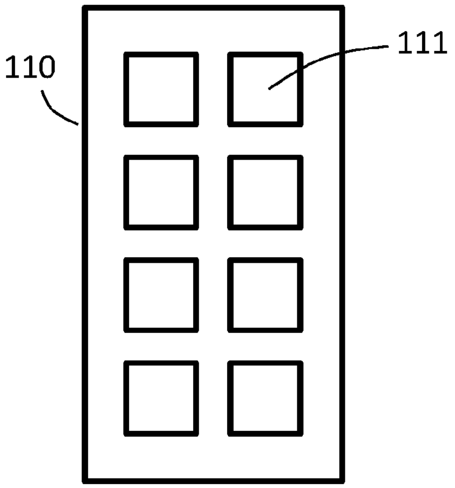
FIG. 4A schematically illustrates an array panel configured for use as an antenna element in various embodiments, suitable for use in the mm wave spectrum.

FIG. 4A shows a front surface of one array panel according to one embodiment. In the shown example, the array panel is a 2×4 patch 111 array, but other configurations are possible. In one embodiment, the array panel comprises a MIMO system which provides 9 dB array gain, with a patch 5 dB gain. In a mm wave spectrum embodiment, each array panel is configured for beamforming. The array panel may comprise antenna circuitry including a Tx/Rx transceiver and an antenna switch, and optionally a down-converter to intermediate frequency (IF) in the GHz range. For an example embodiment, configured for 28 GHz, the array panel size may be 20×40 mm. A layer of the array panel 110, e.g. a backside surface, may comprise a ground plane.

Figure 4B:
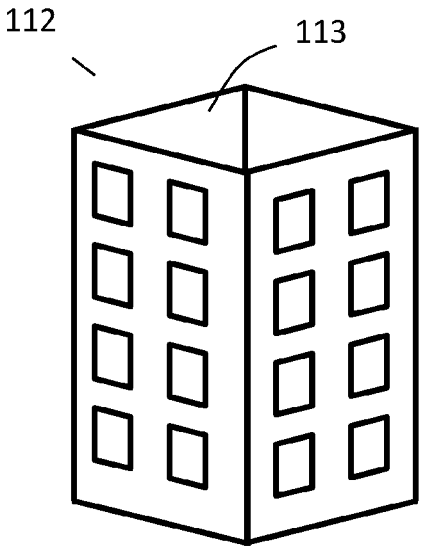
FIG. 4B schematically illustrates an embodiment configuration of the first antenna system part of FIG. 3.

FIG. 4B shows the array panels 110 of the first antenna system as used in the embodiment of FIG. 3, in a perspective view. This arrangement is configured to provide omnidirectional coverage with Power Class 4 performance.

Figure 5A:
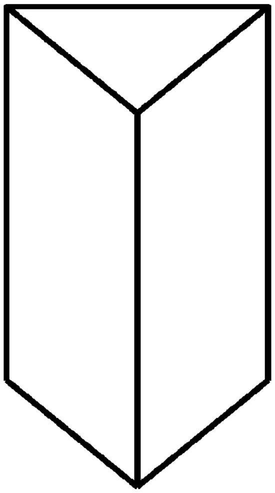
FIGS. 5A and 5B indicate alternative embodiment configurations to the configuration of FIG. 4B.
Figure 5B:
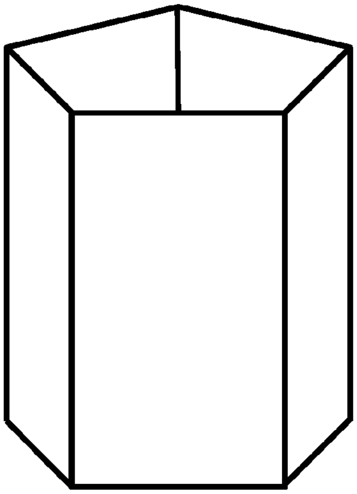

FIGS. 5A and 5B illustrate, by way of examples, alternative arrangements of the antenna elements 110, in cylindrical configurations. The antenna patches 111 are left out for the sake of simplicity. The number of array panels 110 in the arranged in the cylindrical configuration; 3 in FIG. 5A, 4 in FIG. 4B, 5 in FIG. 5B, may be selected dependent on inter alia the spatial coverage capacity of the antenna panels 110.

Figure 6:
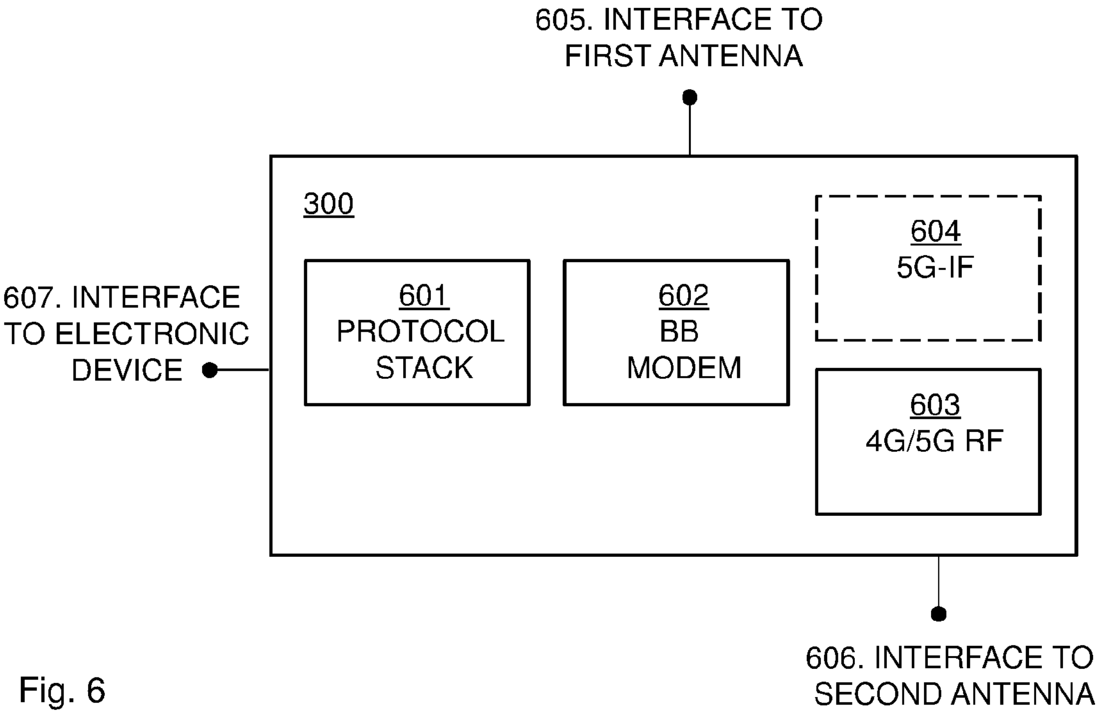
FIG. 6 schematically illustrates an electronic module comprising circuitry for controlling wireless transmission and reception using the first and second antenna systems in various embodiments.

FIG. 6 schematically illustrates an electronic module 300, configured to execute wireless communication using the first 100 and second 200 antenna systems. The electronic module 300 comprises a baseband modem 602 and a radio frequency unit 603 connected to the first 100 and second 200 antenna systems. Moreover, the electronic module 300 comprises a control unit 601, comprising a processor configured to operate the modem according to a protocol stack 601. In some embodiments, the electronic module 300 is configured to execute wireless communication using a protocol stack configured in accordance with 5G specifications using the first antenna system 100, including coverage in the mm wave spectrum, through an interface 605 to the first antenna system. Furthermore, the electronic module may be configured to execute wireless communication using a protocol stack configured in accordance with 4G specifications, and potentially 3G specifications, using the second antenna system 200, through an interface 606 to the second antenna system. The electronic module 300 comprises an interface 607 to an electronic device 1, e.g. for connection to the antenna device interface 8 of the electronic device 1. This way, the electronic device 1 may supply the antenna device 10 with power from its power supply 7, and also with data, e.g. originating from the imaging unit 3, for UL transmission. Moreover, the electronic device 1 may obtain data and/or control information through the antenna device 10 in the DL. In some embodiments, the interfaces 8, 605 may include an RF coaxial cable, and a power and control DC cable.

In some embodiments, the modem 602 is configured to select one of the multiple first antenna elements of the first antenna system 100 for operation at a time. In the embodiment of FIGS. 3-5, each antenna element of the first antenna system 100 is an array panel 110. In other words, only one antenna array 110 is active for transmit and receive at any point in time, when the antenna device 10 is operated in a TDD system such as 5G in the mm wave spectrum. In this operation, the Tx/Rx antenna switch of the first antenna system 100 is driven under control of the modem 602.

In some embodiments the electronic module 300 is arranged inside the cylindrical configuration of the first antenna system 100. With reference to the example of FIG. 3, the electronic module 300 is arranged in the center region encompassed by the array panels 110. By means of this arrangement, i.e., by using a short transmission distance between the electronic module 300 and the array panels 110, low loss transmission of RF signals is obtained in the antenna device 10. With the electronic module 300 arranged inside the cylindric arrangement of the array panels 110, and thereby in close proximity to each of the plurality of array panels 110, the use of an IF (Intermediate Frequency) converter 604 may be dispensed with in a frequency converter stage between the BB modem 602 and the RF unit 603 for frequency up and down conversion. In such an embodiment, the RF unit 603 may be directly connected to the array panels 110. This reduces insertion loss of the otherwise used IF converter 604. In an alternative arrangement, the electronic module 300 may be disposed at an and portion of the antenna device 10, such as at the interface 13, or in an interface between the first 100 and second 200 antenna systems. In such embodiments too, the electronic module 300 will be disposed in close vicinity to, or even in direct contact with, at least the first antenna elements 110. In yet another embodiment, the electronic module 300 may be disposed in the electronic device 10, such as in close proximity to the interface 8 for connection to interface 13 of the antenna device 10.

Figure 7:
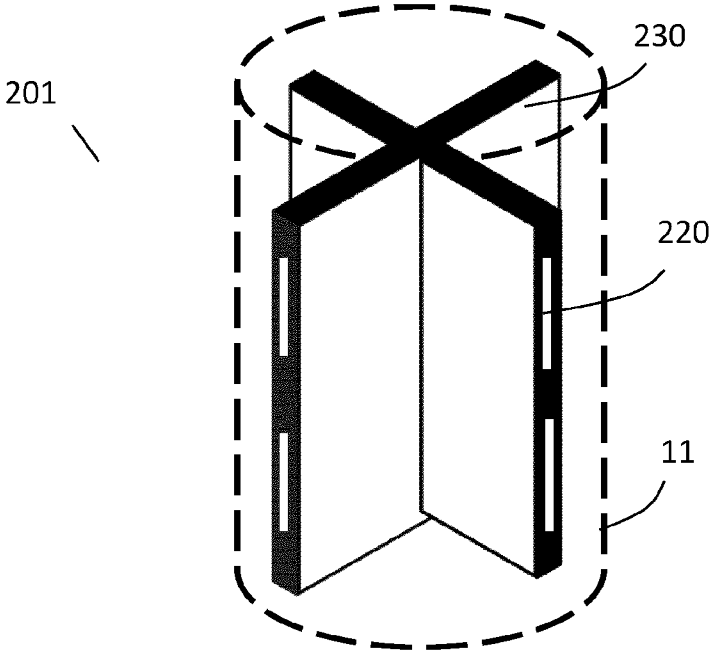
FIG. 7 schematically illustrates a view of a second antenna system part of the antenna device configuration of FIG. 2, according to an embodiment.

FIG. 7 schematically illustrates an embodiment of the second antenna system 200, or at least a portion 201 of the second antenna system 200. The second antenna system 200 comprises a plurality of second antenna elements 220 disposed on orthogonal surfaces of a cross-shaped support structure 230. The second antenna elements 220 may form antennas for sub 6 GHz MIMO with an isolation network. The antenna elements 220, which may form passive antennas, are connected to the electronic module 300 through interface 606, e.g. by cable connection. For operation in a sub 6 GHz 5G MIMO antenna system, e.g. 2-6 GHz, the second antenna system 200 may be configured for 8×8 MIMO in a part 201 of the second antenna system 200. Each antenna element 220 may e.g. be a PCB edge Vivaldi antenna, a dipole antenna, an IFA (Inverted-F Antenna) or other. The cross-shaped support structure 230 may be a cross mounting PCB.

Figure 8:
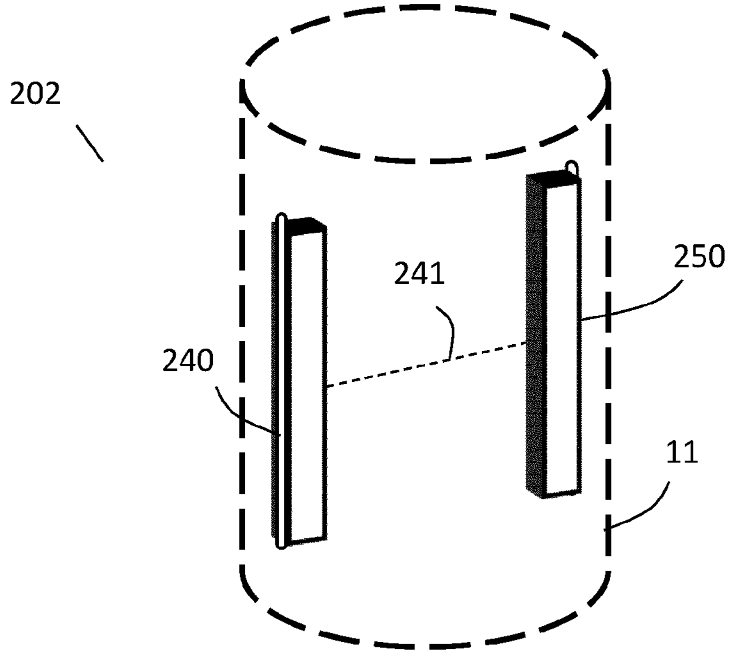
FIG. 8 schematically illustrates a view of a third antenna system part, usable in the antenna device configuration of FIG. 2, according to an embodiment.

FIG. 8 schematically illustrates an optional second part 202 of the second antenna system 200. This section 202 may comprise a low band MIMO antenna system, such as a ¼ wavelength low band 700-960 MHz MIMO antenna. This antenna system may comprise two or more antennas 240, printed on top of a PCB 250. Optionally, a decoupling virtualization line 241 may be used. This way, a reduction of the coupling between the monopoles 240 is obtained, whereby the MIMO efficiency is improved by obtaining low correlation.

Figure 9:
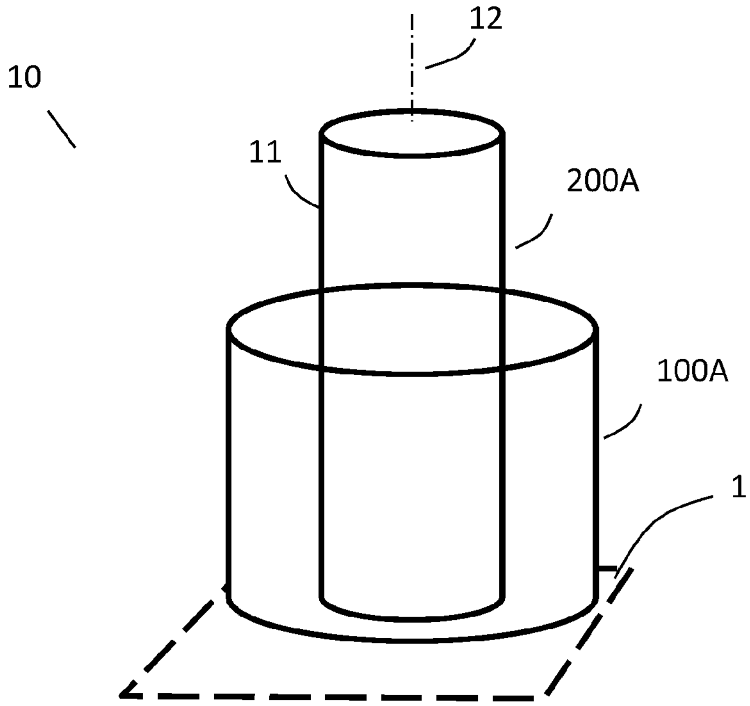
FIG. 9 schematically illustrates a perspective view of an antenna device according to a second overall configuration.

FIG. 9 schematically illustrates a second configuration of the compound antenna device 10. In this arrangement, the first antenna system 100A is arranged concentrically around the second antenna system 200A, wherein the second antenna system 200 acts as a reflector for the first antenna system 100. By configuring the antenna systems in this manner, an improved high band antenna gain is obtained for the first antenna system 100. The second antenna system 200B may comprise a structure as described with reference to FIG. 7 or 8. Other alternative embodiments will be described with reference to FIGS. 10-12.

In some embodiments, the first antenna system 100A comprises a plurality of first antenna elements arranged around the second antenna system 200A. Some examples of this configuration is described in further detail with reference to FIGS. 10-12, where the first antenna elements are denoted 110A, 110B and 110C, respectively. In this configuration, each first antenna element is arranged at a distance D to the second antenna system, which distance correlates to a quarter wavelength of a frequency in the first frequency band. In this context, correlation means that the distance D may equal an integer number of wavelengths of said frequency plus or minus one quarter wavelength, such that reflection of a radio wave from the first antenna element, reflected in the second antenna system 200A, will cause a positive amplification of the transmitted radio waves from the first antenna system 100A.

In various embodiments of the second configuration, the first antenna elements may be monopole antennas, dipole antennas, linear arrays, or array panels without a backside ground surface so as to allow coupling also from the backside. The electronic module 300A, 300B, 300C, comprising the circuitry for driving the compound antenna device 10 including BB modem 602 and RF 603 as described, may be arranged at a bottom portion, or in a midsection, of the antenna device 10, from which it connects to antenna element in the antenna device 10, specifically to at least the first antenna elements 110A, 110B, 110C of the first antenna system. The electronic module 300A may comprise a PCB with a ground plane, wherein the RF circuits 603 are provided under the ground plane with respect to at least the first antenna system.

Figure 10:
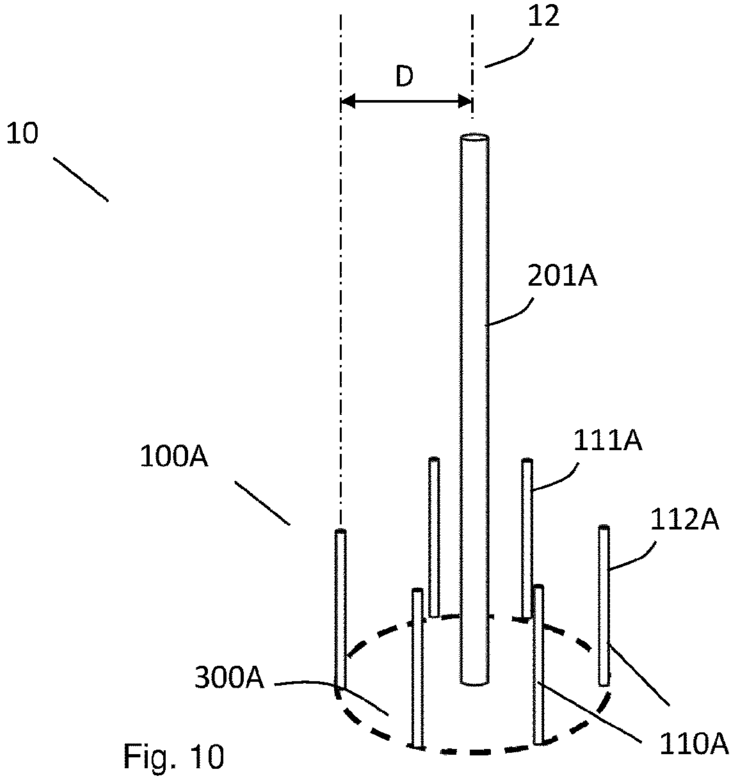
FIG. 10 schematically illustrates antenna elements of an embodiment of the antenna device according to the second configuration.

FIG. 10 illustrates an embodiment wherein the second antenna system 200 includes a central second antenna monopole 201A. This antenna monopole may be a low band antenna, e.g. for 700-960 MHz. In an alternative embodiment, the central second antenna monopole 201A is configured for operation in FR1 of a 5G system. The first antenna system 100A comprises multiple first antenna elements 110A. The first antenna elements 110A may be driven by switching a feeding signal from one specific first antenna element 111A to another specific first antenna element 112A for beamforming or switching beams of the first antenna system 100A. Each first antenna element 110A may comprise a dedicated Front End Module (FEM), or alternatively a common FEM may be used to switch between multiple first antenna elements 110A, such as between all first antenna elements 110A. Each first antenna element 110A is disposed at a distance D outwardly of the central second antenna monopole 201A, so as to obtain constructive reflection for a frequency of the first antenna system 100A, as described.

Figure 11:
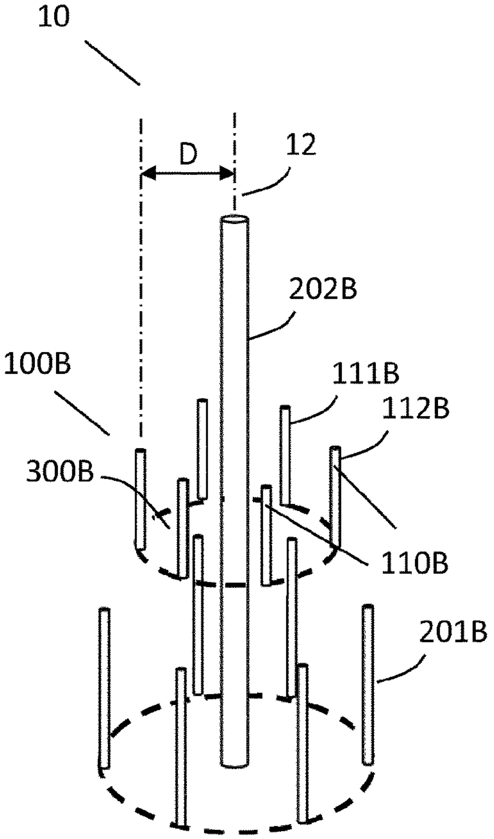
FIG. 11 schematically illustrates antenna elements of another embodiment of the antenna device according to the second configuration.

FIG. 11 illustrates an alternative embodiment of the compound antenna device 10, configured for more than two bands. Herein, the second antenna system 200 includes a central second antenna monopole 202B. This antenna monopole 202B may be a low band antenna, e.g. for 700-960 MHz. Additionally, the second antenna system comprises multiple second antenna elements 201B configured for operation in a middle band, such as FR1 of a 5G system. The second antenna elements 201B may be disposed around the central monopole 202B. The first antenna system 100B comprises multiple first antenna elements 110B which may be driven by switching a feeding signal from one specific first antenna element 111B to another specific first antenna element 112B for beamforming or switching beams of the first antenna system 100B. Each first antenna element 110B may comprise a dedicated FEM, or alternatively a common FEM may be used to switch between multiple first antenna elements 110B, such as between all first antenna elements 110A. Each first antenna element 110B is disposed at a distance D outwardly of the central second antenna monopole 202B, so as to obtain constructive reflection for a frequency of the first antenna system 100B, as described. In this embodiment, the first antenna system 100B is displaced from the middle band portion of the second antenna system 200B, along the axis 12 of the compound antenna device 10.

Figure 12:
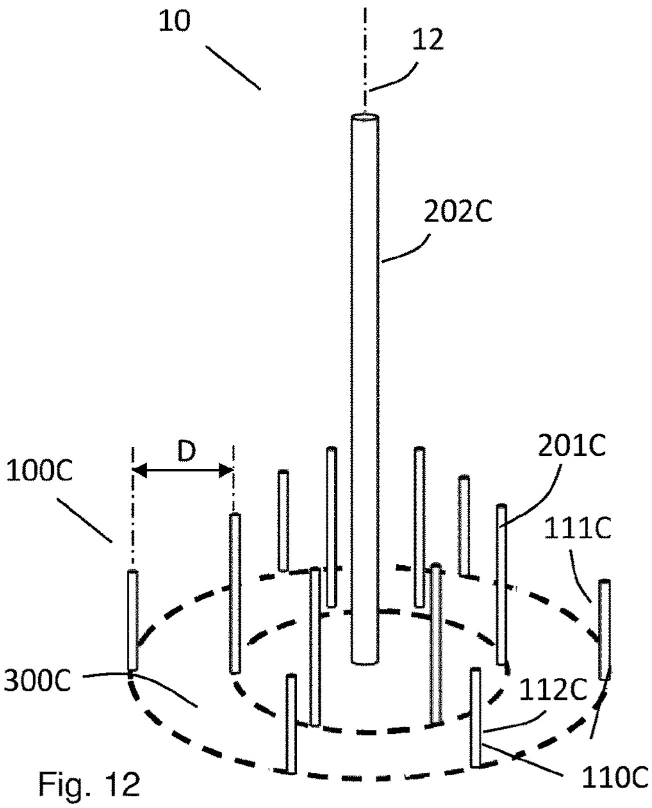
FIG. 12 schematically illustrates antenna elements of yet another embodiment of the antenna device according to the second configuration.

FIG. 12 illustrates yet another embodiment of the compound antenna device 10, configured for more than two bands. Herein, the second antenna system 200 includes a central second antenna monopole 202C. This antenna monopole 202B may be a low band antenna, e.g. for 700-960 MHz. Additionally, the second antenna system comprises multiple second antenna elements 201C configured for operation in a middle band, such as FR1 of a 5G system. The second antenna elements 201C may be disposed around the central monopole 202C. The first antenna system 100C comprises multiple first antenna elements 110C which may be driven by switching a feeding signal from one specific first antenna element 111C to another specific first antenna element 112C for beamforming or switching beams of the first antenna system 100C. Each first antenna element 110C may comprise a dedicated FEM, or alternatively a common FEM may be used to switch between multiple first antenna elements 110C, such as between all first antenna elements 110C. Each first antenna element 110C is disposed at a distance D outwardly of the second antenna system. Specifically, each first antenna element 110C may be disposed at a distance D outwardly of on second antenna element 201C, so as to obtain constructive reflection for a frequency of the first antenna system 100C, as described. In this embodiment, although the antenna elements 110C, 210C, 202C may have different lengths, they are concentrically arranged in a common plane, about the axis 12 of the compound antenna device 10.

Various embodiments have been outlined in the foregoing, illustrating different ways of realizing the solutions provided by the claims. In these embodiments, wherein a projection of the first antenna system 100 and a projection of the second antenna system 200 on a plane perpendicular to the axis 12 of the compound antenna device 10 define overlapping respective areas. Different embodiments may include any combination of the elements and features of the following clauses (C):

C1. A composite antenna device (10) configured for omnidirectional operation, comprising:

a first antenna system (100) configured for use in a first frequency band, comprising multiple first antenna elements (110, 110A) arranged in a cylindrical configuration;

a second antenna system (200) configured for use in a second frequency band at a frequency which is lower than the first frequency band; and a housing (11) enclosing the first and second antenna systems, wherein the first and the second antenna systems are configured for omnidirectional operation about an axis (12) of the composite antenna device.

C2. The composite antenna device of C1, wherein each first antenna element comprises an array panel (110).

C3. The composite antenna device of C2, wherein each array panel is arranged with a panel surface facing away from said axis.

C4. The composite antenna device of any preceding clause, comprising an electronic module (300), comprising a baseband modem (602) and a radio frequency unit (603) connected to the first and second antenna systems.

C5. The composite antenna device of C4, wherein the radio frequency unit (603) is connected to the baseband modem (602) without intermediary frequency converter (604).

C6. The composite antenna device of C4 or C5, wherein said electronic module is arranged inside said cylindrical configuration.

C7. The composite antenna device of C6, comprising a transmit/receive switch for each array panel arranged inside said cylindrical configuration.

C8. The composite antenna device of C7, wherein the baseband modem is configured to control the switch for Time Division Duplex, TDD, operation of the respective array panel to activate only one array panel at a time.

C9. The composite antenna device of any preceding clause, further comprising an interface at a first end (13) of the cylindric housing for connection to an electronic device (1), wherein the first antenna system is arranged closer to said interface than the second antenna system is.

C10. The composite antenna device of any preceding clause, wherein the second antenna system comprises a plurality of second antenna elements (220) disposed on orthogonal surfaces of a cross-shaped support structure (230).

C11. The composite antenna device of C1, wherein the first antenna system (100A) is arranged concentrically around the second antenna system (200A), wherein the second antenna system acts as a reflector for the first antenna system.

C12. The composite antenna device of C11, wherein the multiple first antenna elements (112A, 112B, 112C) are arranged around the second antenna system (201A, 202B, 201C).

C13. The composite antenna device of C11, wherein each first antenna element is arranged at a distance (D) to the second antenna system, which distance correlates to a quarter wavelength of a frequency in the first frequency band.

C14. The composite antenna device of any of C10-C12, wherein the second antenna system includes a plurality of second antenna elements (201C) arranged around said axis.

C15. The composite antenna device of any of C10-C13, wherein the second antenna system includes a central second antenna element (201A,202B, 202C).

C16. The composite antenna device of any preceding clause, wherein a projection of the first antenna system and a projection of the second antenna system on a plane perpendicular to said axis define overlapping respective areas.

C17. The composite antenna device of any preceding clause, wherein the first frequency band is in a mm wave spectrum.

C18. Video camera device (1), comprising an imaging unit (3) including an image sensor (4), and a composite antenna device (10) according to any preceding clause connected to said imaging unit for transmission of video data.

The various solutions proposed herein provide for a compound antenna device suitable for use as an external antenna to an electronic device 1, and which is specifically suited for an implementation wherein the first antenna system is configured for beamforming.

The invention claimed is:

1. A composite antenna device configured for omnidirectional operation, comprising:

a first antenna system configured for use in a first frequency band of a first frequency range, comprising multiple first antenna elements arranged in a cylindrical configuration;

a second antenna system configured for use in a second frequency band in a second frequency range at a frequency which is lower than the first frequency band; and a housing enclosing the first and second antenna systems, wherein the first and the second antenna systems are configured for omnidirectional operation about an axis of the composite antenna device, and wherein the first and second antenna systems are arranged in the housing in a longitudinal direction along the axis.

2. The composite antenna device of claim 1, wherein each first antenna element comprises an array panel, wherein each array panel is arranged with a panel surface facing away from said axis.

3. The composite antenna device of claim 2, comprising an electronic module, comprising a baseband modem and a radio frequency unit connected to the first and second antenna systems.

4. The composite antenna device of claim 3, wherein the radio frequency unit is connected to the baseband modem without intermediary frequency converter.

5. The composite antenna device of claim 3, wherein said electronic module is arranged inside said cylindrical configuration.

6. The composite antenna device of claim 5, comprising a transmit/receive switch for each array panel, arranged inside said cylindrical configuration.

7. The composite antenna device of claim 6, wherein the baseband modem is configured to control the switch for Time Division Duplex (TDD) operation of the respective array panel to activate only one array panel at a time.

8. The composite antenna device of claim 1, further comprising an interface at a first end of the housing for connection to an electronic device, wherein the first antenna system is arranged closer to said interface than the second antenna system is.

9. The composite antenna device of claim 1, wherein the second antenna system comprises a plurality of second antenna elements disposed on orthogonal surfaces of a cross-shaped support structure.

10. The composite antenna device of claim 1, wherein the first antenna system is arranged concentrically around the second antenna system, wherein the second antenna system acts as a reflector for the first antenna system.

11. The composite antenna device of claim 10, wherein the multiple first antenna elements are arranged around the second antenna system.

12. The composite antenna device of claim 10, wherein each first antenna element is arranged at a distance to the second antenna system, which distance correlates to a quarter wavelength of a frequency in the first frequency band.

13. The composite antenna device of claim 10, wherein the second antenna system includes a plurality of second antenna elements arranged around said axis.

14. The composite antenna device of claim 10, wherein the second antenna system includes a central second antenna element.

15. The composite antenna device of claim 1, wherein a projection of the first antenna system and a projection of the second antenna system on a plane perpendicular to said axis define overlapping respective areas.

16. The composite antenna device of claim 1, wherein the first frequency range is in a mm wave spectrum.

17. A video camera device, comprising an imaging unit including an image sensor, and a composite antenna device according to claim 1 connected to said imaging unit for transmission of video data.

* * * * *